US012741644B2

(12) United States Patent
Wilhelmsson et al.

(10) Patent No.: US 12,741,644 B2
(45) **Date of Patent: *Sep. 22, 2026**

(54) VEHICLE DEACTIVATION CONTROL

(71) Applicant: VOLVO TRUCK CORPORATION, Gothenburg (SE)

(72) Inventors: Martin Wilhelmsson, Torslanda (SE); Linus Nordholm, Askim (SE); Tobias Smidebrant, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,593

(22) Filed: Dec. 22, 2023

(65) Prior Publication Data

US 2024/0227819 A1 Jul. 11, 2024

(30) Foreign Application Priority Data

Jan. 10, 2023 (EP) .................................... 23150990

(51) Int. Cl.
*B60W 30/18* (2012.01)
*B60W 30/184* (2012.01)

(52) U.S. Cl.
CPC .... *B60W 30/18054* (2013.01); *B60W 30/184* (2013.01); *B60W 2300/125* (2013.01); *B60W 2556/10* (2020.02); *B60W 2556/50* (2020.02)

(58) Field of Classification Search
CPC .. B60W 50/00; B60W 60/00; B60W 2556/10; B60W 2050/0037;

(Continued)

(56) References Cited

U.S. PATENT DOCUMENTS 6,805,090 B2 10/2004 Bertness et al.
7,363,126 B1 * 4/2008 Zhong ................ G01C 21/3484 701/25

(Continued)

FOREIGN PATENT DOCUMENTS

CN 113928328 A * 1/2022 ............. G06N 3/045
DE 102012217615 A1 5/2014

(Continued)

OTHER PUBLICATIONS

Frank, R. (1988). Replacing Relays with Semiconductor Devices in Automotive Applications. SAE Transactions, 97, 245-251. http://www.jstor.org/stable/44547371 (Year: 1988).*

(Continued)

*Primary Examiner* — Erin D Bishop
*Assistant Examiner* — Keith A von Volkenburg
(74) *Attorney, Agent, or Firm* — Jeffri A. Kaminski; Venable LLP

(57) ABSTRACT

A computer system comprising a processor device is provided. The processor device is configured to receive a deactivation request to deactivate a heavy-duty vehicle. The processor device is further configured to determine a controlled partial deactivation instruction of at least one subsystem of the vehicle, wherein the controlled partial deactivation instruction is determined by an autonomous model comprising a historical usage pattern of the vehicle. The historical usage pattern comprises information of deactivation events and activation events of the vehicle that has historically occurred at reference locations. The processor device is further configured to control the vehicle to execute the controlled partial deactivation instruction such that the vehicle is at least partially deactivated either immediately, or after a delay, as determined by the controlled partial deactivation instruction.

17 Claims, 8 Drawing Sheets

(58) Field of Classification Search
CPC ..... B60W 2300/125; B60W 30/18054; B60W 30/184; B60W 2556/50
USPC ........................................................ 701/23
See application file for complete search history.

(56) References Cited

U.S. PATENT DOCUMENTS 8,373,582 B2 * 2/2013 Hoffberg ................ G08G 1/166 340/995.13
9,114,806 B2 8/2015 Wang et al.
10,023,138 B1 * 7/2018 Lurie .................. B60R 16/0231
10,823,128 B1 11/2020 Kessels et al.
11,112,790 B2 * 9/2021 Gross ...................... H04W 4/44
11,782,451 B1 * 10/2023 Venkatraman ........... G06N 3/09 701/26
12,277,873 B2 * 4/2025 Ferguson ................ G07F 17/12
2010/0235025 A1 9/2010 Richter et al.
2010/0235030 A1 9/2010 Xue et al.
2012/0143392 A1 * 6/2012 Lurie .................... B60W 50/10 701/1
2014/0067239 A1 3/2014 Doering et al.
2014/0182991 A1 7/2014 Cornic
2014/0201126 A1 * 7/2014 Zadeh .................... A61B 5/165 706/52
2015/0088613 A1 * 3/2015 Pierce, Jr. .......... G06Q 30/0206 705/7.35
2015/0197248 A1 7/2015 Breed et al.
2015/0275787 A1 10/2015 Dufford et al.
2016/0311423 A1 * 10/2016 Storm ..................... B60L 50/40
2016/0320200 A1 * 11/2016 Delling .............. G01C 21/3605
2017/0270490 A1 * 9/2017 Penilla ................. G07C 5/0808
2017/0369010 A1 * 12/2017 Tarte ..................... B60W 50/14
2018/0204111 A1 * 7/2018 Zadeh .................. G06N 3/0464
2020/0184278 A1 * 6/2020 Zadeh .................... G06N 3/044
2020/0201319 A1 * 6/2020 Gross ..................... G05D 1/224
2020/0276967 A1 9/2020 Lacroix et al.
2021/0374569 A1 * 12/2021 Jezewski ................ G06N 20/00
2022/0057796 A1 * 2/2022 Yang .................... G05D 1/0061
2022/0176972 A1 6/2022 Miller et al.
2022/0196418 A1 6/2022 Wray et al.
2022/0252414 A1 8/2022 Lerner et al.
2023/0050705 A1 * 2/2023 Wang .................. B60W 40/076
2023/0303052 A1 9/2023 Gesang et al.
2024/0051550 A1 * 2/2024 Gonzalez Cisneros ...................... B60W 50/06
2024/0067194 A1 * 2/2024 Slattery ................. B60W 50/06
2025/0229762 A1 7/2025 Gesang et al.
2025/0269856 A1 8/2025 Gesang et al.

FOREIGN PATENT DOCUMENTS

DE 102017212166 A1 1/2019
DE 102019104485 A1 * 8/2019 ................ B60J 3/04
DE 102021107932 A1 * 1/2022 ............ B60W 10/06
EP 3009316 B1 9/2017
EP 3307596 B1 8/2019
EP 3575170 A1 12/2019
EP 3601000 B1 1/2021
JP 7139505 B2 * 9/2022 ........... G06Q 10/047
WO WO-2020023490 A1 * 1/2020 ........... G05D 1/0297
WO WO-2022267067 A1 * 12/2022 ........... G06F 1/3206

OTHER PUBLICATIONS

Ryu, J., and Gerdes, J. C. (Aug. 5, 2004). "Integrating Inertial Sensors With Global Positioning System (GPS) for Vehicle Dynamics Control ." ASME. J. Dyn. Sys., Meas., Control. Jun. 2004; 126(2): 243-254. https://doi.org/10.1115/1.1766026 (Year: 2004).*

Extended European Search Report in corresponding European Application No. 23150988.6 dated Jun. 28, 2023 (9 pages).

Extended European Search Report in corresponding European Application No. 23150990.2 dated Jun. 30, 2023 (9 pages).

Non Final Office Action dated Jul. 22, 2026 in corresponding U.S. Appl. No. 18/396,957, 28 pages.

* cited by examiner

VEHICLE DEACTIVATION CONTROL

TECHNICAL FIELD

The disclosure relates generally to vehicle control. In particular aspects, the disclosure relates to vehicle deactivation control. The disclosure can be applied in heavy-duty vehicles, such as trucks, buses, and construction equipment. Although the disclosure may be described with respect to a particular vehicle, the disclosure is not restricted to any particular vehicle.

BACKGROUND

Heavy-duty vehicles are typically operating during long periods of time and over large geographical areas. Although being in operation, the vehicle is not always driving, i.e., being in ongoing motion such that its position is changed. For instance, the vehicle sometimes has to stop at stoplights, during delivery or pick-up of goods, at traffic stockings, at pedestrian crossings, or at charging stations, to name some common reasons of vehicle stops. During these stops, the vehicle is often entering an idle mode that might cause unnecessary energy consumption. In order to save energy and thus provide a more economic driving procedure, most heavy-duty vehicles of today often comprise control functionality for deactivating the vehicle after a stop has been recorded.

The prior art offers very little versatility in terms of controlling the vehicle deactivation. The required condition in order to execute a vehicle deactivation is often a lapse of a mere fixed timer. Other alternative solutions seen in the art involve performing analyses on states of the vehicle components or (sub)systems to determine whether a deactivation is suitable. These solutions are costly, inaccurate and oftentimes also prone to an energy consumption that even exceeds the corresponding energy consumption of a vehicle that is never deactivated at stops.

The present inventors have realized the above-mentioned deficiencies of the prior art, and are herein presenting improvements in relation to vehicle deactivation control that seek to solve, or at least mitigate, one or more of these deficiencies.

SUMMARY

According to a first aspect of the disclosure, a computer system comprising a processor device is provided. The processor device is configured to receive a deactivation request to deactivate a heavy-duty vehicle; in response to said receiving, determine a controlled partial deactivation instruction of at least one subsystem of the heavy-duty vehicle, wherein the controlled partial deactivation instruction is determined by an autonomous model, said autonomous model comprising a historical usage pattern of the heavy-duty vehicle, the historical usage pattern comprising information of deactivation events and activation events of the heavy-duty vehicle having historically occurred at reference locations; and control the heavy-duty vehicle to execute the controlled partial deactivation instruction such that the heavy-duty vehicle is at least partially deactivate either immediately, or after a delay, as determined by the controlled partial deactivation instruction.

The first aspect of the disclosure may seek to provide a vehicle deactivation control strategy. A technical benefit may include a versatile, energy efficient and robust control procedure that lengthens the lifetime of vehicle components while at the same time provides an economic and eco-friendly driving with minimized emissions and low energy consumption.

According to a second aspect of the disclosure, a computer-implemented method for controlling heavy-duty vehicle deactivation is provided. The method comprises, by a processor device of a computer system, receiving a deactivation request to deactivate a heavy-duty vehicle; in response to said receiving, determining, by the processor device, a controlled partial deactivation instruction of at least one subsystem of the heavy-duty vehicle, wherein the controlled partial deactivation instruction is determined by an autonomous model, said autonomous model comprising a historical usage pattern of the heavy-duty vehicle, the historical usage pattern comprising information of deactivation events and activation events of the heavy-duty vehicle having historically occurred at reference locations; and controlling, by the processor device, the heavy-duty vehicle to execute the controlled partial deactivation instruction such that the heavy-duty vehicle is at least partially deactivate either immediately, or after a delay, as determined by the controlled partial deactivation instruction.

In some examples, the autonomous model is configured to receive input data comprising usage data of the heavy-duty vehicle with reference to said reference locations, and the deactivation request, process the input data, and output the controlled partial deactivation instruction as a result of said processing of the input data. A technical benefit may include that the autonomous model will be provided with, process and output information relating to previous vehicle usage, which means that the controlled vehicle activation will be more intelligent.

In some examples, the autonomous model is weighted for some of the reference locations and/or a particular deactivation request to deactivate the heavy-duty vehicle. A technical benefit may include selective control of certain potentially important reference locations and/or requests.

In some examples, the autonomous model calculates a cost function, wherein said deactivation and activation events are associated with positive costs, wherein time periods between a deactivation event and a subsequent activation event among said deactivation events and activation events having historically occurred are associated with negative costs. A technical benefit may include being able to perform calculations on various events and putting it into perspective when determining the controlled partial deactivation instruction.

In some examples, the cost function calculates a usage threshold limit by combining the positive and negative costs for said reference locations. A technical benefit may include providing a combined value that reflects the actual net cost.

In some examples, said executing of the controlled partial deactivation instruction involves determining whether the usage threshold limit is satisfied for a current geographical location. A technical benefit may include accurate real-time comparisons such that prompt control of the vehicle deactivation is achieved.

In some examples, the cost function is updated over time by continuously calculating positive and negative costs for the reference locations. A technical benefit may include robustness for the autonomous model and thus the controlled partial deactivation instruction.

In some examples, the cost function is a forgetting function in response to said continuous calculations of positive and negative costs for the reference locations. A technical benefit may include dynamically adjusting the autonomous model with new (and improved) data over time. The forgetting function readily adapts to newly encountered data pertaining to a change in vehicle driving or stopping behaviour.

In some examples, the at controlled partial deactivation instruction comprises an instruction to set said at least one subsystem into a lower energy consumption mode; and/or an instruction to deactivate said at least one subsystem. A technical benefit may include dynamic eco-driving functionalities.

In some examples, the reference locations comprises one or more geographical areas defined by geographical coordinates retrieved from one or more positioning systems. A technical benefit may include being able to discover patterns by the autonomous model such that its performance may be improved.

In some examples, the deactivation request is received from a vehicle subsystem in response to a vehicle subsystem condition being met, or a driver of the heavy-duty vehicle, the driver being a person or an autonomous unit. A technical benefit may include being able to receive the deactivation request from different sources to provide the autonomous model with improved data in a more efficient way.

In some examples, said controlling comprises selectively opening and/or closing of relays of one or more contactors of the heavy-duty vehicle. A technical benefit may include selective control of vehicle contactors such that a lesser energy consumption is achieved.

In some examples, the deactivation and activation events of the heavy-duty vehicle comprises geographical data pertaining to the reference locations. A technical benefit may include storing geographical information that improves the accuracy in determining the controlled partial deactivation instruction.

According to a third aspect, a heavy-duty vehicle is provided. The heavy-duty vehicle comprises the processor device to perform the method of the second aspect.

In some examples, the heavy-duty vehicle comprises one or more contactors, a contactor being an electromechanical switching device configured to mechanically operate an electric contact of one or more of the at least one subsystem of the heavy-duty vehicle. A technical benefit may include being able to control electromechanical units of the vehicle.

In some examples, the at least one subsystem is an energy-consuming vehicle component. A technical effect may include providing less energy consumption.

According to a fourth aspect, a computer program product is provided. The computer program product comprises program code for performing, when executed by the processor device, the method of the second aspect.

According to a fifth aspect, a control system is provided. The control system comprises one or more control units configured to perform the method of the second aspect.

According to a sixth aspect, a non-transitory computer-readable storage medium is provided. The non-transitory computer-readable storage medium comprises instructions, which when executed by the processor device, cause the processor device to perform the method of the second aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

As discussed in the Background section, the available prior art solutions are insufficient when it comes to vehicle deactivation control. More specifically, in many situations the deactivation control functionality being in place instead causes an excessive amount of deactivations where and when they are not needed. The present disclosure advantageously analyses where (geographically) deactivations are needed, to what extent deactivations are needed, and which components deactivations should be targeted at. The present disclosure will therefore not be associated with any risk of deactivating a component that need not be deactivated, or deactivating a component when there is a high risk of the same component needing to be active again in the near future. To this end, the energy efficiency and thus the economic driving approach of the heavy-duty vehicle will be improved while at the same time minimizing component wear and tear.

Figure 1:
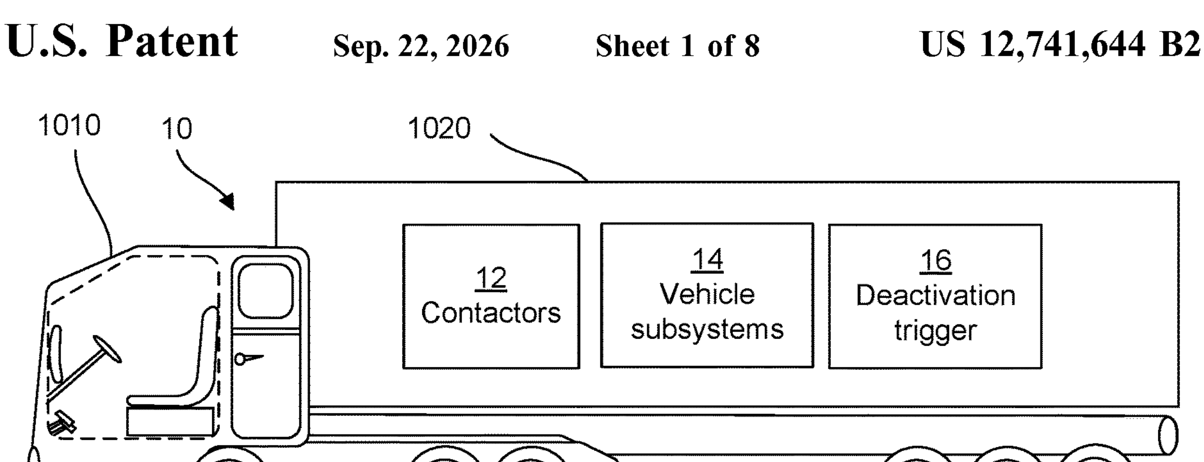
FIG. 1 is an exemplary schematic illustration of a heavy-duty vehicle.

FIG. 1 is an exemplary schematic illustration of a heavy-duty vehicle 10 (hereinafter referred to vehicle 10 for reasons of brevity). This particular vehicle 10 comprises a tractor unit 1010 which is arranged to tow a trailer unit 1020. In other examples, other heavy-duty vehicles may be employed, e.g., trucks, buses, and construction equipment. Although not explicitly visualized in the figure, the skilled person will appreciate that the vehicle 10 comprises all necessary vehicle units and associated functionality such that it may operate as the skilled person would expect of a vehicle 10. Emphasis in the present disclosure is instead directed at the vehicle deactivation control functionality, as will now be discussed.

The vehicle 10 comprises one or more contactors 12, one or more vehicle subsystems 14 and one or more deactivation triggers 16. Although these components 12, 14, 16 are visualized as schematic blocks at the trailer unit 1020, the skilled person will appreciate that these placements are just for illustrative purposes. The units 12, 14, 16 may be arranged and be operable anywhere in the vehicle 10 (for instance at the tractor unit 1010 or at one or more trailer units 1020), or alternatively possibly remotely from the vehicle 10 (i.e., being remotely operable).

The (at least one) contactor 12 may be an electromechanical switching device configured to mechanically operate an electric contact of one or more of the at least one subsystem 14 of the vehicle 10. The electromechanical switching device is preferably a relay. Alternatively, the contactor 12 may be based on other switching technologies, such as magnetically induced switches, mechanical switches, pneumatic switches, light switches, Hall-effect switches, inertial switches, isolator switches, optical switches, piezo switches, pull/push switches, thermal switches, to name a few exemplary switching technologies. The contactor 12 may be disconnected or connected, where each disconnect or connect of the contactor 12 incurs a cost. Contactor 12 connects are shown to be particularly expensive, so it is desired to minimize connects. The present disclosure effectively minimizes the necessary number of disconnects and connects of the contactor 12 by selective control of the vehicle deactivation, for instance via closing/opening of relays.

The (at least one) vehicle subsystem 14 may be a power-consuming vehicle component, i.e., any component of a vehicle that in some way consumes power that may potentially be optimized by the smart vehicle deactivation control procedure as presented in this disclosure. The term component shall therefore be interpreted in the broadest of sense, namely as any component that is a part of a vehicle system or subsystem. To this end, the power-consuming vehicle component may be any one of an engine, a drive train, a braking system, a cooling system, a battery system, an electronic control module (ECU), or any part thereof.

The (at least one) deactivation trigger 16 may be any suitable device capable of providing a deactivation request. The deactivation trigger 16 may be a physical component or a software-controlled component. The deactivation trigger 16 may be manually or automatically controlled. The deactivation trigger 16 may be controlled from within or around the vehicle 10, or from a remote location. The deactivation trigger 16 may be operable by a driver of the vehicle, where the driver is a person or an autonomous unit (in the case of autonomously driven vehicles). Alternatively or additionally, the deactivation trigger 16 may be operable by a vehicle subsystem 14 in response to a vehicle subsystem condition being met. For instance, a battery module may indicate when its charging level has surpassed a certain limit such that it may subsequently be controlled to be at least partially deactivated immediately or after a delay determined by a historical usage pattern. Other scenarios may be realized for other vehicle subsystems 14. The deactivation trigger 16 may be a key ignition, a wireless car key, a mobile-device controllable functionality, a physical button or switch or a vehicle subsystem-controllable unit, to name a few exemplary deactivation triggers 16. If the deactivation trigger 16 utilizes wireless communication, this communication may be based on short-range or long-range communication standards commonly applied in the art. For instance, the short-range or long-range communication standards may include IEEE 802.11, IEEE 802.15, ZigBee, WirelessHART, WiFi, Bluetooth®, BLE, RFID, WLAN, MQTT IoT, CoAP, DDS, NFC, AMQP, LoRaWAN, Z-Wave, Sigfox, Thread, EnOcean, mesh communication, any other form of proximity-based device-to-device radio communication signal such as LTE Direct, W-CDMA/HSPA, GSM, UTRAN, LTE or Starlink.

Figure 2:
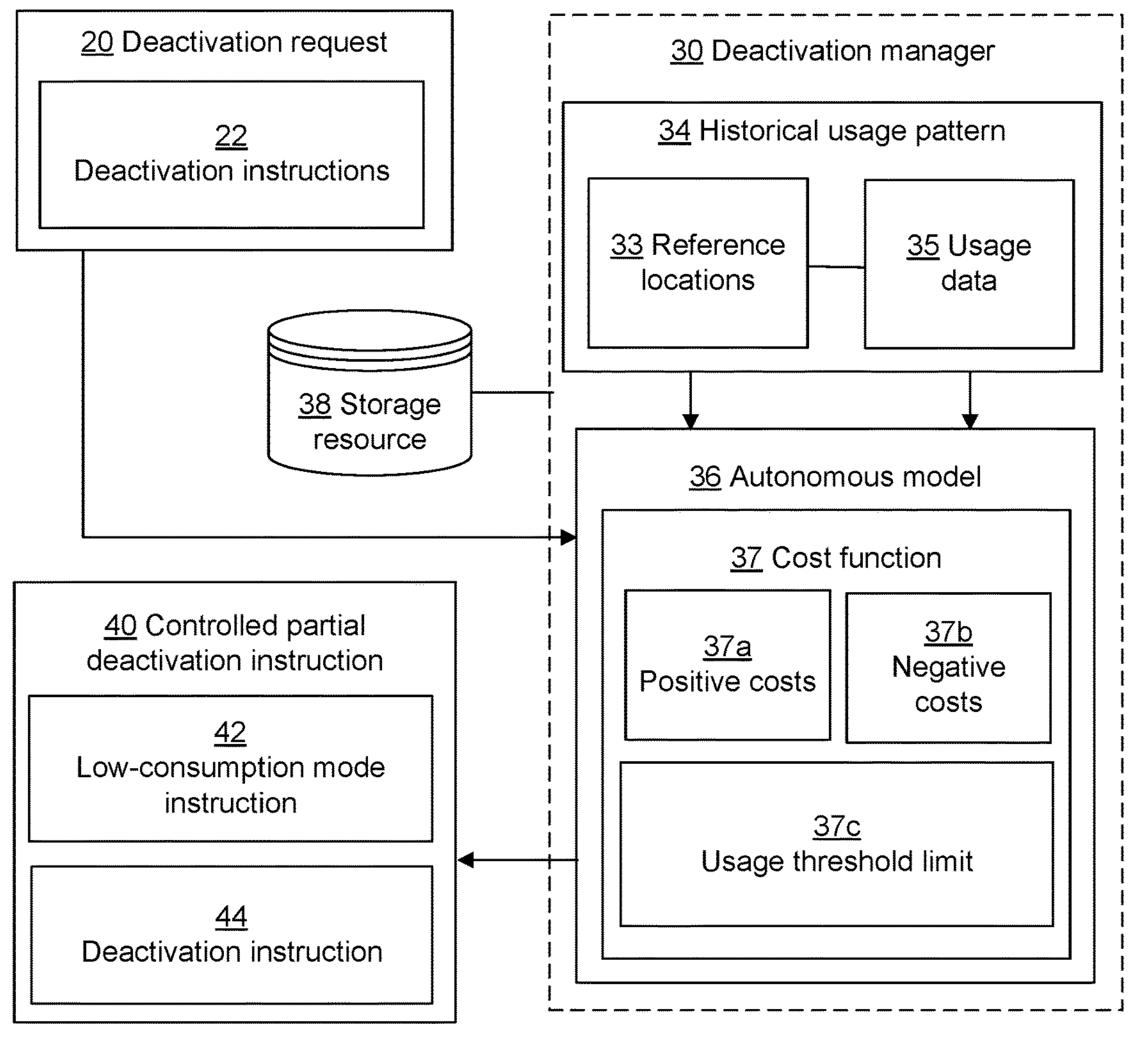
FIG. 2 is an exemplary schematic block diagram visualizing data being used by the heavy-duty vehicle for controlling an at least partial deactivation thereof.

FIG. 2 is an exemplary schematic block diagram visualizing data being used by the heavy-duty vehicle 10 for controlling an at least partial deactivation thereof. The data flow is initiated by the provisioning of a deactivation request 20. The deactivation request 20 may comprise deactivation instructions 22 to deactivate the vehicle. The deactivation request 20 may be initiated by actuation of the deactivation trigger 16, as was discussed with reference to FIG. 1. The deactivation request 20 thus corresponds to a normal deactivation request of the vehicle 10.

The deactivation request 20 may be provided to a deactivation manager 30. The deactivation manager 30 is to be understood as a software module capable of receiving, processing and outputting data associated with the vehicle. The deactivation manager 30 may be provisioned by a vehicle server, or any number of distributed (e.g., cloud) servers. Such a server may be a cloud-based server implemented using any commonly known cloud-computing platform technologies, such as e.g., Amazon Web Services, Google Cloud Platform, Microsoft Azure, DigitalOcean, Oracle Cloud Infrastructure, IBM Bluemix or Alibaba Cloud. Other alternative server configurations may be realized, based on any type of client-server or peer-to-peer (P2P) architecture. Server configurations may thus involve any combination of e.g., web servers, database servers, email servers, web proxy servers, DNS servers, FTP servers, file servers, DHCP servers, to name a few.

The deactivation manager 30 may comprise a storage resource 38. The storage resource 38 may be configured to store data associated with the deactivation manager 30. The storage resource 38 may be maintained by and/or configured as a cloud-based service, being included with or external to the cloud-based server as described above. Connection to the cloud-based storage resource 38 may be established using DBaaS (Database-as-a-service). For instance, the cloud-based storage resource 38 may be deployed as a SQL data model such as MySQL, PostgreSQL or Oracle RDBMS. Alternatively, deployments based on NoSQL data models such as MongoDB, Amazon DynamoDB, Hadoop or Apache Cassandra may be used. DBaaS technologies are typically included as a service in the deactivation manager 30.

In response to receiving the deactivation request 20, the deactivation manager 30 is configured to determine a controlled partial deactivation instruction 40 of at least one subsystem 14 of the vehicle 16. The controlled partial deactivation instruction 40 differs from the deactivation instructions 22 of the deactivation request 20 in that it is not a normal deactivation of the vehicle 10. The purpose of the controlled partial deactivation instruction 40 is to selectively control which, to what extent, and (geographically) where certain subsystems 14 of the vehicle 10 are to be deactivated. To this end, the controlled partial deactivation instruction 40 may comprise an instruction 42 to set at least one subsystem 14 into a lower energy consumption mode. Alternatively or additionally, the controlled partial deactivation instruction 40 may comprise an instruction 44 to deactivate at least one subsystem 14.

The controlled partial deactivation instruction 40 is then executed, thereby at least partially deactivating a vehicle subsystem 14 either immediately, or after a delay, as determined by a historical usage pattern 34 (which will soon be discussed in detail). The delay may be an arbitrary time period ranging from a few seconds to several hours. The delay is not restricted to any particular duration. The term "at least partially deactivated immediately or after a delay" means that some subsystems 14 are completely deactivated immediately, some other subsystems 14 are deactivated after the delay, and some others are set into a lower energy consumption mode directly or after the delay. The procedure of executing the controlled partial deactivation instruction 40 controls this.

The predefined duration may depend on a plurality of different factors relating to the historical usage pattern 34 of the vehicle 10. The historical usage pattern 34 may comprise usage data 35 that comprises information of deactivation events and activation events of the vehicle 10 having historically occurred. The historical usage pattern 34 is thus autonomously updated with geographical data pertaining to where these deactivation and activation events have occurred, i.e. at what reference locations 33. Accordingly, the geographical data included in the historical usage pattern 34 defines location-related information for all deactivation and activation events that have previously been performed by the vehicle 10. For instance, this may be recorded each time the vehicle 10 receives a deactivation request or each time a deactivation or activation of any one of the subsystems 14 of the vehicle 10 is recorded. The geographical data may be retrieved by one or more positioning systems, for instance GPS, GNSS, GLONASS, BeiDou, Galileo, NavIC or QZSS. The positioning system(s) may be arranged as an onboard system on the vehicle 10, or alternatively as a remote service configured to provide the vehicle 10 with said geographical data. Yet alternatively, the geographical data may be shared between a plurality of vehicles by telematics data transfer. The geographical data may be outdoor or indoor (e.g., as realized in large indoor logistics facilities, etc.) geographical data.

In view of the above, the deactivation and activation events of the vehicle 10 have historically occurred at reference locations 33. The geographical data is associated with the reference locations 33. Reference locations 33 may comprise one or more geographical areas defined by geographical coordinates, e.g., as retrieved from the one or more positioning systems as described above. The geographical areas are not limited to a particular size. Different geographical areas may vary in size. The reference locations 33 may be defined by a range of a plurality of geographical coordinates that define an area, e.g., the area covered by interconnecting four coordinates via a (closest) path. Alternatively, the reference location 33 is defined by fixed graphical coordinates that also cover an arbitrary error margin, e.g., the fixed graphical coordinates x, y may cover the general range x±0.001, y±0.001. The skilled person will appreciate other possible schemes of defining the reference locations 33 depending on the deactivation/activation activity of the vehicle 10. "Deactivation/activation activity" is to be interpreted as the number of deactivation or activations occurring over a given time period.

In some examples, a geographical area may be as small as a minimum area that can accommodate the vehicle 10, e.g., defined by a couple of meters in each direction (x, y seen from above). This example may be realized in scenarios where exact pick-up or drop-off locations for the vehicle 10 can be determined with high confidence. In other examples, a geographical area may be as large as an entire city or even between cities. This example may be realized in scenarios where the confidence of knowing exactly where the vehicle 10 will be associated with high deactivation/activation activity is lower. Clearly, any scenario in between the two examples as described above may be realized, i.e., of varying confidence in position determination and/or varying sizes of geographical areas. By being aware of this and other types of geographical data, the controlled partial deactivation instruction 40 can be dynamically updated and be responsive to the current location of the vehicle 10 where the deactivation request 20 is received such that an energy efficient partial deactivation of the vehicle 10 can be performed. In other words, the historical usage pattern 34 is used to control what action is to be taken in response to a currently received deactivation request 20.

Further seen in FIG. 2 is an autonomous model 36. The autonomous model 36 is configured to determine the controlled partial deactivation instruction 40 based on the historical usage pattern 34 of the vehicle 10. To this end, the autonomous model 36 comprises information of the historical usage pattern 34, i.e., the previously occurred deactivation and activation events as well as the reference locations 33. The autonomous model 36 may be configured to compute statistical data associated with the historical usage pattern 34 and related geographical data. The statistical data may be used to provide an intelligent determination of the controlled partial deactivation instruction 40. To this end, the autonomous model 36 comprises self-learning features. The autonomous model 36 may be trained on a dataset comprising previously occurred activation or deactivation events. Whenever a deactivation request 20 is received, the autonomous model 36 may thus perform autonomous classifications based on activation events or deactivation events having previously occurred at the reference locations 33. The classifications may, for instance, relate to the partial deactivations of the vehicle (e.g., delay or no delay, duration of delay, low energy consumption mode or not, and so forth). The autonomous model 36 may implement any known supervised or unsupervised learning algorithm known in the art, such as binary, multi-class, or multi-label classification and/or clustering algorithms. For instance, algorithms such as logistic regression, support vector machines, kernel estimation, decision trees and/or neural networks may be utilized. Furthermore, the autonomous model 36 is capable of learning from each classification of a controlled partial deactivation instruction 40, such that additionally received deactivation requests 20 may be better classified in terms of subsystem 14 wear and tear and/or energy efficiency.

In view of the above, the autonomous model 36 may receive input data comprising usage data 35 of the vehicle 10. The usage data 35 is related to the reference locations 33. Furthermore, the input data to the autonomous model 36 also includes the deactivation request 20 comprising the deactivation instructions 22. The autonomous model 36 may be further configured to process the input data in order to output the controlled partial deactivation instruction 40. Some of the input data provided to the autonomous model 36 may be weighted for some of the reference locations 33 and/or some particular deactivation instructions 22. For example, if the deactivation instructions 22 are associated with a requested emergency shutdown, these deactivation instructions 22 will be significantly weighted such that it is guaranteed that no emergency shutdown of the vehicle 10 is delayed. In other examples, some reference locations 33 are more important than other locations and can be weighted accordingly. More important reference locations 33 may include certain areas (e.g., eco-driving zones) where it is known that the vehicle 10 will be stopped for longer periods of time or will perform a plurality of deactivation requests 20 in shorter periods of time. Additionally, weights may also be provided for certain reference locations 33 where it is known that a certain driver that often/seldom requests deactivation of the vehicle 10 will be operating the vehicle 10. Other reasonable weighting schemes may be applied as realized by the skilled person.

Although not shown in FIG. 2, the deactivation manager 30 may in some examples be configured to manage external changes to the reference locations 33, including, for instance, logistics facilities being moved from one location to another or updates in data associated with positioning systems.

In the example shown in FIG. 2, the autonomous model 36 calculates a cost function 37. The deactivation and activation events are associated with positive costs 37*a*, and time periods between a deactivation event and a subsequent activation event among the deactivation and activation events having previously occurred are associated with negative costs 37*b*. The other way around would be a possibility as well (i.e., switching which of the events that incur positive and negative costs 37*b*, 37*a*). The cost function 37 may calculate a usage threshold limit 37*c* by combining the positive and negative costs 37*a*, 37*b* for various reference locations 33. Hence, executing the controlled partial deactivation instruction 40 of the subsystem 14 may involve determining whether the usage threshold limit 37*c* is satisfied for a current location of the vehicle 10. Satisfying the usage threshold limit 37*c* for a current location of the vehicle 10 may be interpreted as current vehicle usage exceeding a limit which is associated with causing a certain type of partial vehicle deactivation.

The cost function 37 may be updated over time by continuously calculating positive and negative costs 37*a*, 37*b* for the reference locations 33. By said continuous calculation, the cost function 37 may be a forgetting function. Forgetting functions are known in the art as a way of describing how accuracy or discriminability declines as the temporal distance from the event to be remembered increases. In this sense, if the cost function 37 detects a change in behaviour of the calculated positive and negative costs 37*a*, 37*b*, the computed usage threshold limit 37*c* may be quickly and dynamically adjusted by over time forgetting previous occurrences of the events that generated the costs 37*a*, 37*b*. The cost function 37 acting as a forgetting function readily adapts to newly encountered data pertaining to a change in vehicle driving or stopping behaviour. Forgetting functions have not been applied in the prior art for these purposes and may be particularly effective for intelligent vehicle deactivation control purposes.

Figure 3:
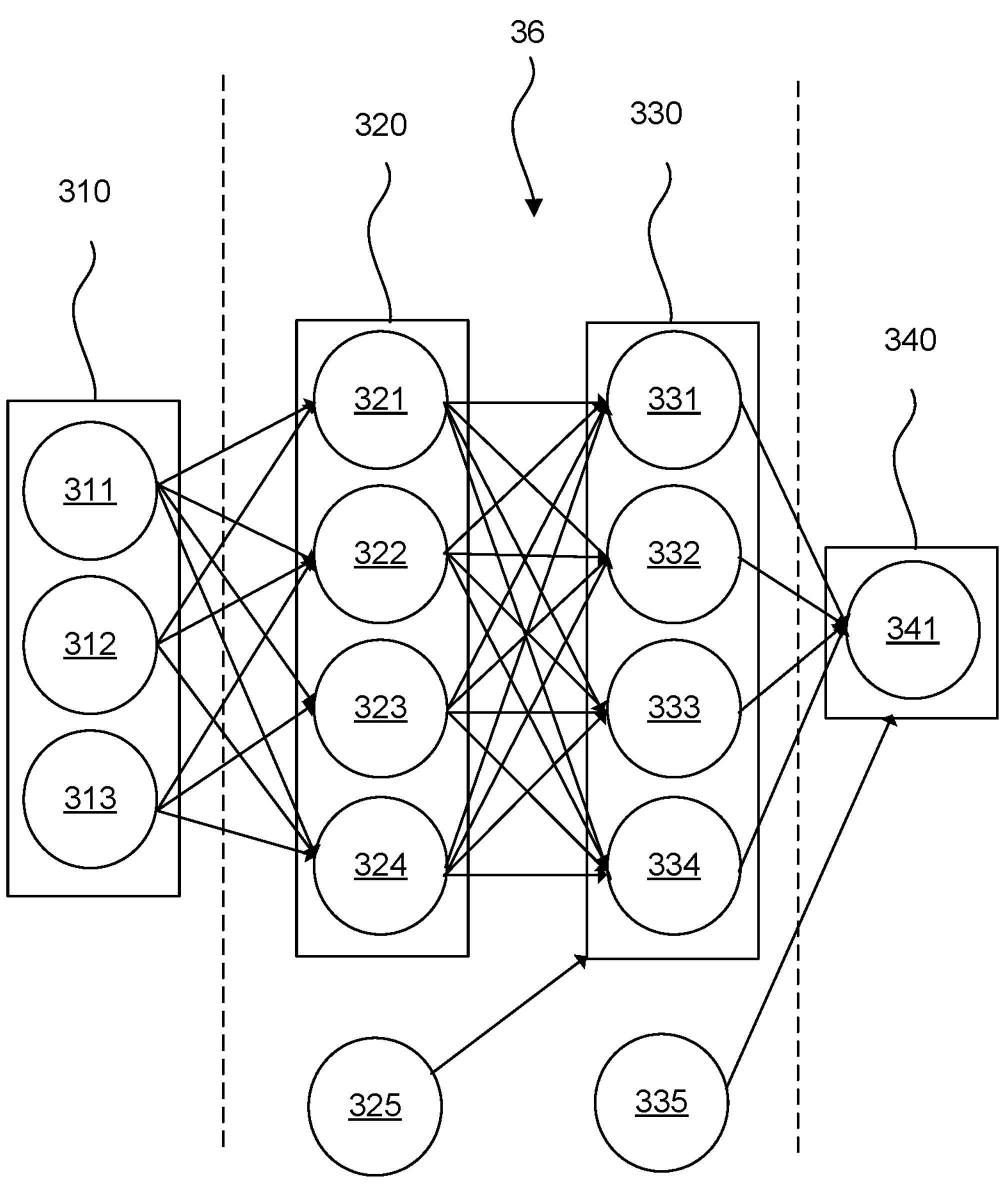
FIG. 3 is an exemplary illustration of an autonomous model which may be used to determine an at least partial vehicle deactivation.

FIG. 3 is an exemplary illustration of an autonomous model 36 which may be used to determine an at least partial vehicle deactivation. The autonomous model 36 is exemplified as a neural network having an input layer 310, two hidden layers 320, 330, and an output layer 340. The input layer 310 comprises three nodes 311, 312, 313, the first hidden layer 320 comprises four nodes 321, 322, 323, 324, the second hidden layer 330 comprises four nodes 331, 332, 333, 334 and the output layer 340 comprises one node 341. Moreover, the neural network comprises two weight nodes 325, 335, each being associated with a respective hidden layer 320, 330. The skilled person appreciates that this is just an exemplary neural network that can be implemented as the autonomous model 36. Other networks may include any suitable number of input nodes, any suitable number of hidden layers and associated hidden nodes, any suitable number of output nodes, and any suitable number of weight nodes. The neural network may implement backpropagation for training purposes such that its performance of classifying vehicle deactivations may be improved. The input nodes 311, 312, 313 may receive input data comprising usage data 35 of the vehicle 10, reference locations 33 and deactivation requests 20. The output node 341 may output the controlled partial deactivation instruction 40 as a result of the processing of the input data by the hidden layers 320, 330 and associated weight nodes 325, 335.

Figure 4:
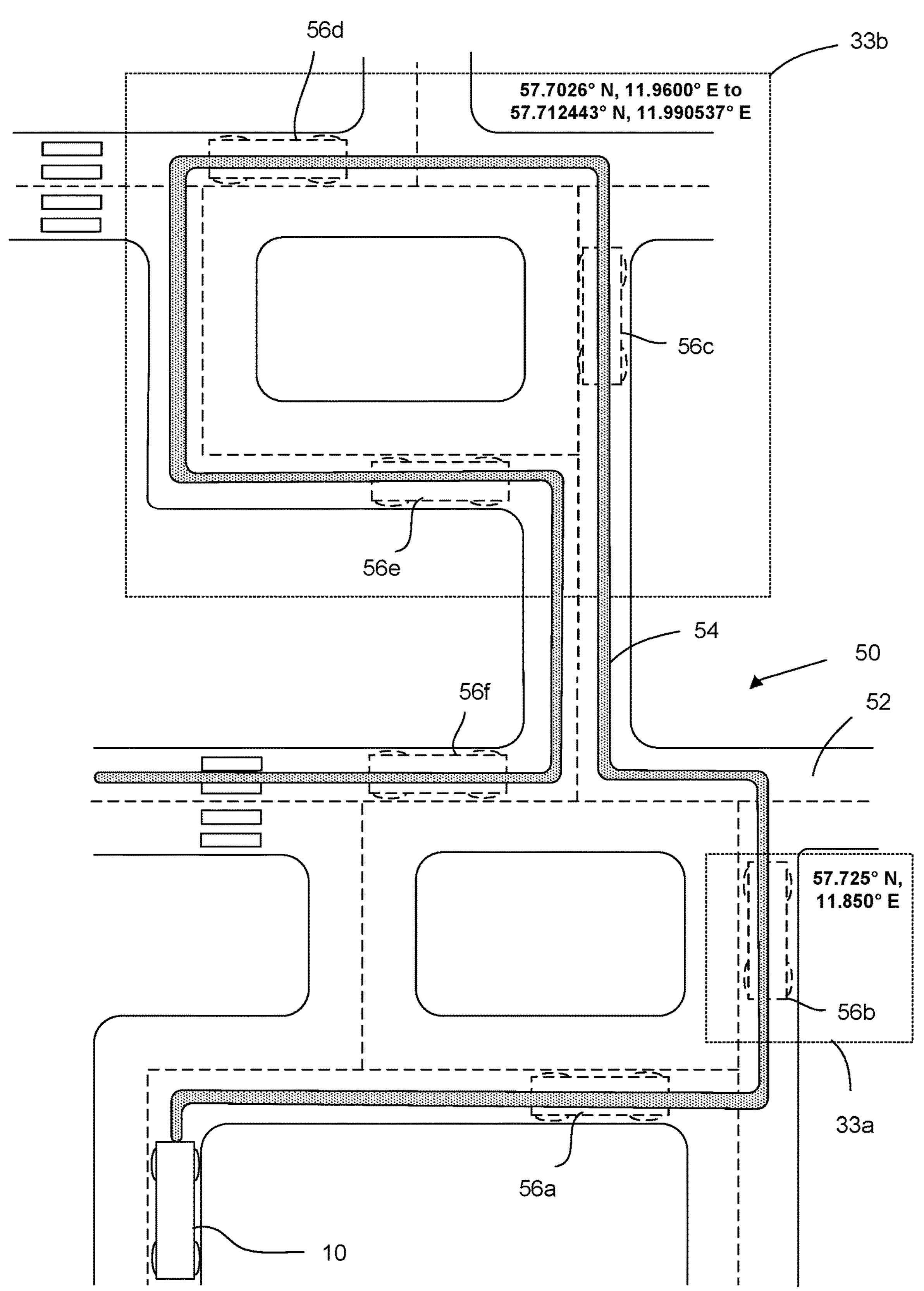
FIG. 4 is an exemplary illustration of a road map where the heavy-duty vehicle may operate at various reference locations.

FIG. 4 is an exemplary illustration of a road map 50 where a vehicle 10 may operate. The road map 50 comprises a plurality of interconnected road segments 52, and the vehicle 10 is operating on the road segments 52 while following a general route 54. While travelling on the route 54, the vehicle 10 is assuming a plurality of vehicle positions 56*a-f*. In the exemplary situation depicted by FIG. 4, it is assumed that the vehicle 10 has previously been travelling generally according to the route 54 sometime in the past. To this end, historical information about previously occurred deactivation and activation actions has been retrieved. The historical usage pattern 34 has therefore indicated two distinct reference locations 33*a*, 33*b* where high vehicle deactivation/activation activity is occurring. The first reference location 33*a* is a smaller geographical area that is defined by the geographical coordinates 57.725° N, 11.850° E, which correspond to a particular drop-off/pick-up area at a Volvo office in Gothenburg, Sweden. The second reference location 33*b* is a larger geographical area that is defined generally by the distance between the two sets of geographical coordinates 57.7026° N, 11.9600° E to 57.712443° N, 11.990537° E, which correspond to a central location in the city center of Gothenburg, Sweden. Hence, both of these reference locations 33*a*, 33*b* are associated with high deactivation/activation activity. Since the deactivation/activation activity is high for these particular reference locations 33*a*, 33*b*, deactivation of one or more subsystems 14 of the vehicle 10 is thus delayed when the vehicle 10 is located within these locations 33*a*, 33*b*, respectively, even if deactivation is requested by the deactivation request 20. In this particular example, this generally occurs when the vehicle 10 is positioned at location 56*b*, and at positions 56*c*, 56*d*, 56*e*, respectively. For the positions 56*a* and 56*f* that are not geographically associated with periods of high deactivation activity, vehicle subsystems 14 may be controlled to be deactivated in response to receiving a deactivation request 20, as it is statistically unlikely that an upcoming activation is to be performed any time in the near future. In either one of the positions 56*a-f*, the controlled partial deactivation instruction 40 is executed such that the vehicle 10 is at least partially deactivated immediately or after a delay. Clearly, "at least partially" may be no deactivation, a complete deactivation, or anywhere therebetween, as has been discussed above.

Figure 5A:
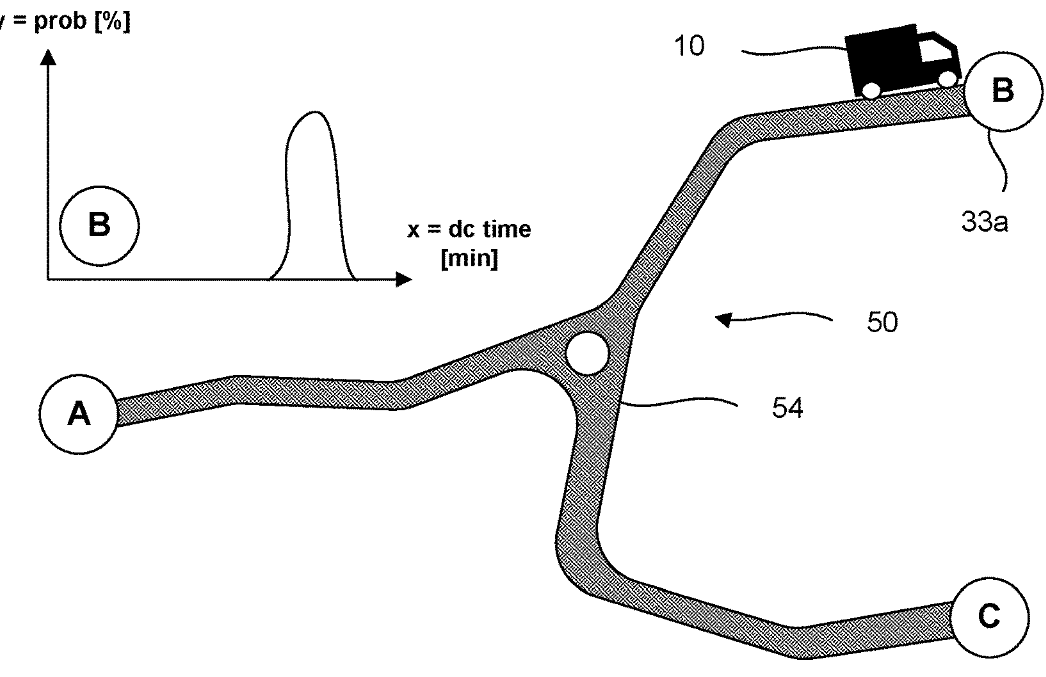
FIGS. 5A-B are exemplary illustrations of a vehicle deactivation control strategy according to two different scenarios.
Figure 5B:
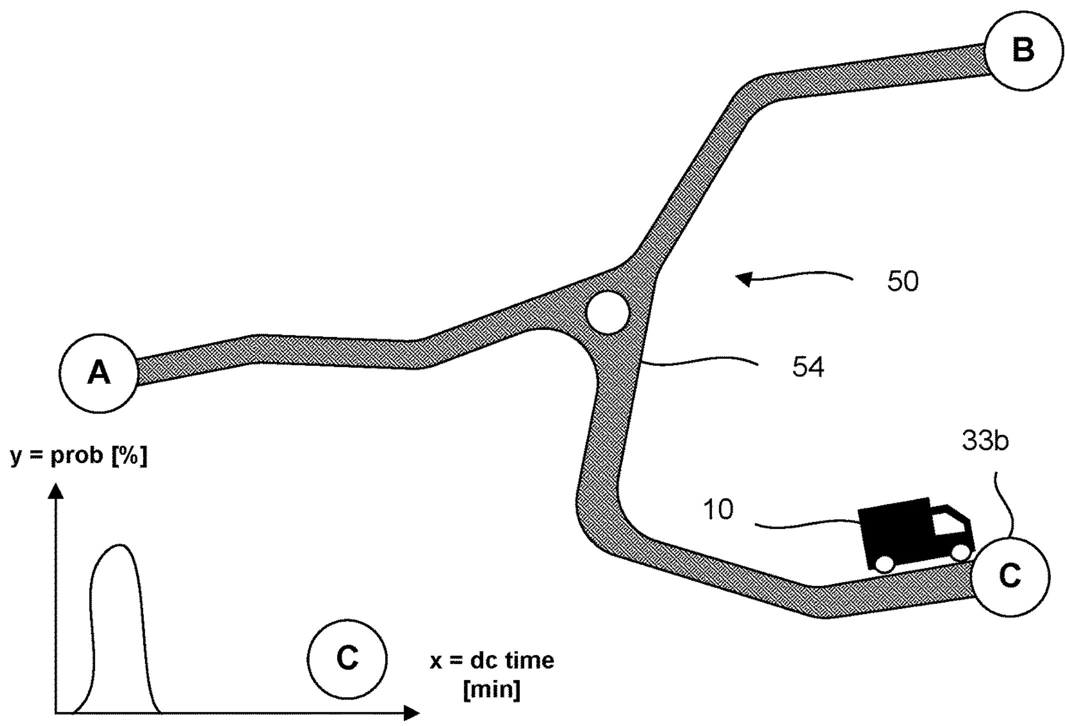

FIGS. 5A-B are exemplary illustrations of a vehicle deactivation control strategy according to two different scenarios.

In FIG. 5A, a vehicle 10 has driven on a road map 50 along a route 54 from location "A" to location "B". Location "B" corresponds to a first reference location 33*a*. Based on historical usage pattern of the vehicle 10 with reference to the first reference location 33*a*, the vehicle 10 has previously learnt that at this location the vehicle 10 is expected to be deactivated for a long time (e.g., as statistically determined), as seen in the schematic diagram "B". This may be a couple of minutes or more. Hence, the vehicle 10 is deactivated as soon as the driver requests deactivation.

In FIG. 5B, the vehicle 10 has driven on the road map 50 along the route 54 from location "A" to location "C". Location "C" corresponds to a second reference location 33*b*. Based on historical usage pattern of the vehicle 10 with reference to the second reference location 33*b*, the vehicle 10 has previously learnt that at this location the deactivation times are almost always relatively short (e.g., as statistically determined), as seen in the schematic diagram "C" compared to "B". This may be a couple of seconds. Hence, when the driver requests deactivation, the vehicle 10 uses a longer delay before allowing deactivation, to not cause an unnecessary deactivation. If the prediction is correct, then the driver will most likely request to re-activate the vehicle 10 before the long delay time has ended, and therefore the vehicle 10 has managed to avoid an unnecessary deactivation using prediction based on the historical usage pattern.

FIGS. 6A-E illustrate exemplary schematic diagrams that may be used in determining an at least partial vehicle deactivation at reference locations. In the following example, the autonomous model 36 calculates a cost function 37, as was explained with reference to FIG. 2.

Figures 6A, 6B, 6C, 6D, 6E:
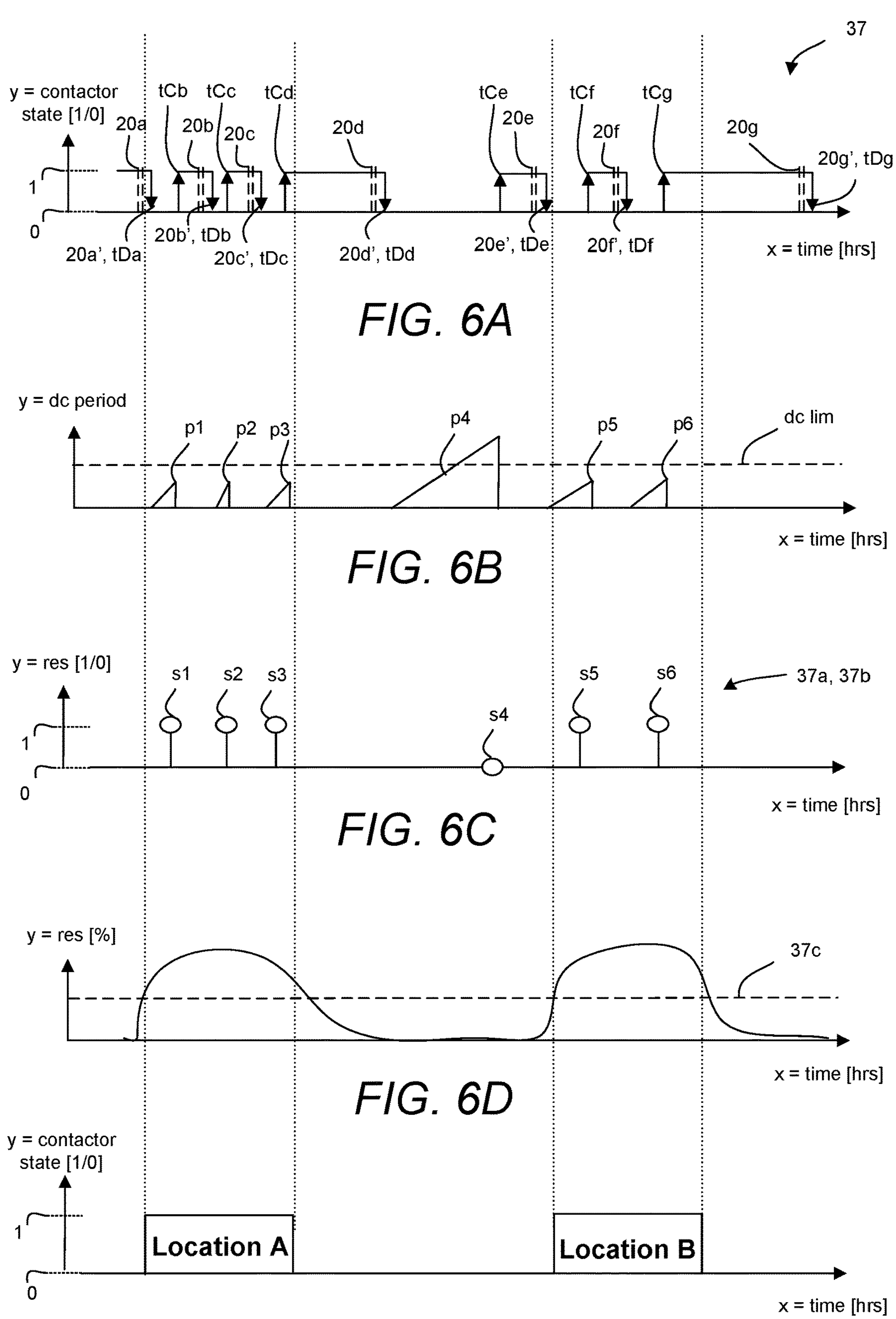
FIGS. 6A-E illustrate exemplary schematic diagrams that may be used in determining an at least partial vehicle deactivation at various reference locations.

FIG. 6A shows a diagram of deactivation requests 20*a-g* occurring over time [hrs]. After a deactivation request 20*a-g* has been received, the actual disconnect 20*a'-g'* will be executed, for instance by a contactor disconnect, after a delay. The time upon which the actual disconnects 20*a'-g'* occur are stored as tDa to tDg and the connector state is shifted from "1" to "0", where "1" on the y-axis corresponds to a contactor being connected, and "0"on the y-axis corresponds to the contactor being disconnected. Further, the times upon which subsequent connects occur are stored as tCa to tCg and the connector state is shifted from "0" to "1".

The total disconnect periods are calculated by subtracting the connect times tCa to tCg with the disconnect times tDa to tDg, thereby obtaining total disconnect periods p1 to p6, as seen in FIG. 6B. Furthermore, a time limit threshold de lim is defined. The period p4 that exceeds the time limit threshold de lim is considered a long disconnect and periods p1, p2, p3, p5, p6 that do not exceed the time limit threshold de lim are considered short disconnects.

Based on which periods that exceed the time limit threshold dc lim, binary evaluation sample results s1-s6 are determined, as shown in FIG. 6C. As indicated in FIG. 6C, the samples s1, s2, s3, s5, s6 are given "1" as a result and the sample s4 is given "0" as a result. These results are to be considered as incurring positive or negative costs 37*a*, 37*b*.

In FIG. 6D, the positive and negative costs 37*a*, 37*b* are presented as a continuous cost function y=f(x), where y represents statistical probabilities for a deactivation request 20 to trigger deactivation delay or a lower energy consumption mode of a subsystem 14 at a particular time. Moreover, a suitable usage threshold limit 37*c* is defined.

FIG. 6E shows, based on the cost function 37, that two points in time are associated with sufficiently high activity with respect to activation/deactivation actions so as to maintain the contactor state at "1" even though deactivation requests 20 are obtained. These two points in time are related to two distinct locations ("Location A" and Location B"). Note that this is a different example from the one described with reference to FIGS. 5A-B, so the locations are different from those explained therein. These locations may be used as the geographical reference locations 33 as discussed herein.

It should therefore be understood that geographical data associated with "Location A" and "Location B" are stored and used for subsequent deactivation control. To this end, if it is discovered at a later point in time (e.g., any time/day/season/month, etc.) that the vehicle 10 is located at either one of these locations, deactivation control is performed accordingly. In the example of FIGS. 6A-E reference locations are thus defined based on deactivation and/or activation activity occurring at particular geographical areas defined by geographical data. Such defining of reference locations may also be applicable to the other examples described in the present disclosure, without necessarily requiring implementation of the cost function 37.

Figure 7:
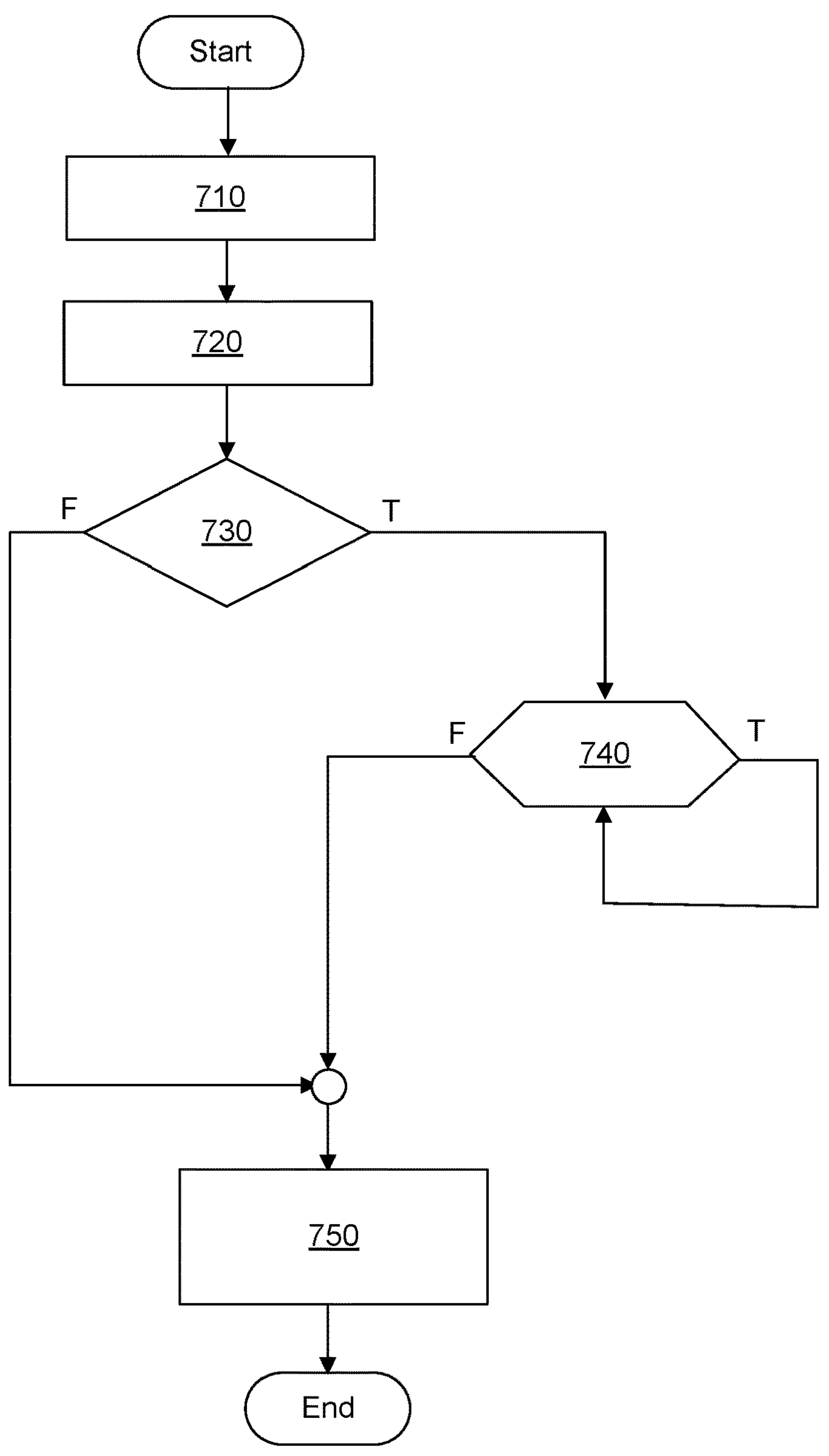
FIG. 7 is an exemplary schematic flowchart illustration of a method.

FIG. 7 is an exemplary schematic flowchart illustration of a method. At 710, the method comprises receiving a deactivation request. At 720, the process of determining the controlled partial deactivation instruction is initiated. At 730, a recommended deactivation delay is compared to a threshold limit, and if failing to exceed the threshold limit, the vehicle is deactivated as normal at 750. This corresponds to a normal operation at a reference location of relatively low activation/deactivation activity. Conversely, if the recommended deactivation delay exceeds the threshold limit, the method proceeds to 740, where a deactivation delay is initiated. The deactivation delay lasts until the vehicle no longer operates within the geographical reference location. After this occurs, the vehicle is deactivated at 750. Hence, the method involves executing a controlled partial deactivation instruction for at least one subsystem by delaying the deactivation at 740.

Figure 8:
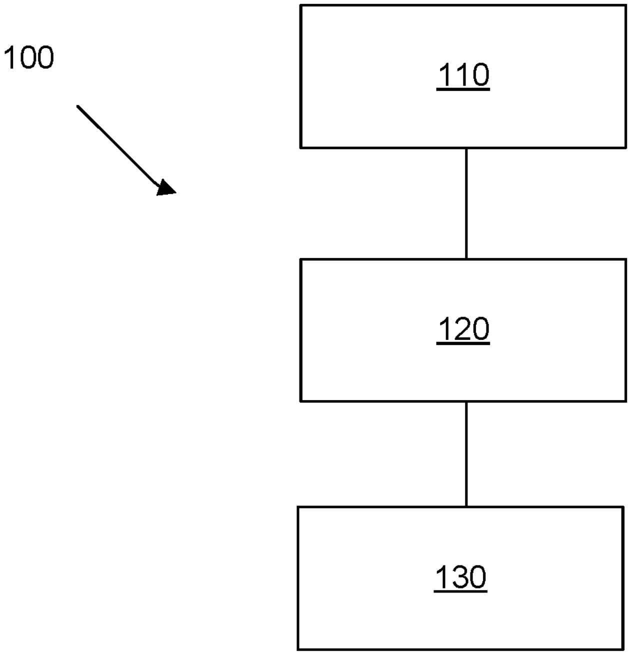
FIG. 8 is an exemplary schematic flowchart illustration of a method.

FIG. 8 is a schematic diagram of a flowchart of a computer-implemented method 100 for controlling heavy-duty vehicle activation according to one example. The method 100 comprises receiving 110 a deactivation request to deactivate a heavy-duty vehicle. Further, the method 100 comprises determining 120 a controlled partial deactivation instruction of at least one subsystem of the heavy-duty vehicle, wherein the controlled partial deactivation instruction is determined by an autonomous model, said autonomous model comprising a historical usage pattern of the heavy-duty vehicle, the historical usage pattern comprising information of deactivation events and activation events of the heavy-duty vehicle having historically occurred at reference locations. The method 100 further comprises controlling 130 the heavy-duty vehicle to execute the controlled partial deactivation instruction such that the heavy-duty vehicle is at least partially deactivated either immediately, or after a delay, as determined by the controlled partial deactivation instruction.

Figure 9:
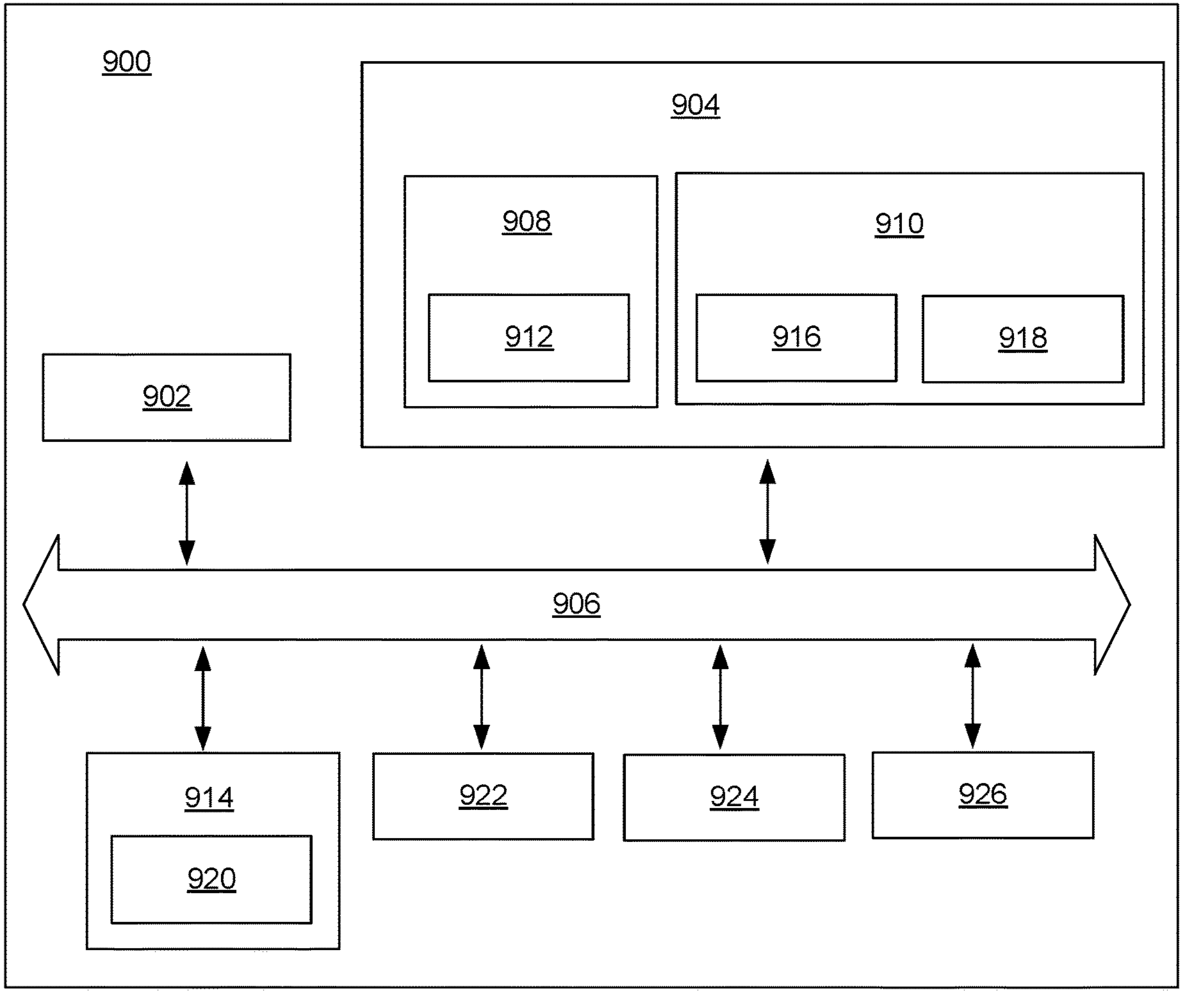
FIG. 9 is a schematic diagram of a computer system for implementing examples disclosed herein according to one example.

FIG. 9 is a schematic diagram of a computer system 900 for implementing examples disclosed herein. The computer system 900 is adapted to execute instructions from a computer-readable medium to perform these and/or any of the functions or processing described herein. The computer system 900 may be connected (e.g., networked) to other machines in a LAN, an intranet, an extranet, or the Internet. While only a single device is illustrated, the computer system 900 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 900 may comprise at least one computing device or electronic device capable of including firmware, hardware, and/or executing software instructions to implement the functionality described herein. The computer system 900 may include a processor device 902 (may also be referred to as a control unit), a memory 904, and a system bus 906. The computer system 900 may include at least one computing device having the processor device 902. The system bus 906 provides an interface for system components including, but not limited to, the memory 904 and the processor device 902. The processor device 902 may include any number of hardware components for conducting data or signal processing or for executing computer code stored in memory 904. The processor device 902 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 906 may be any of several types of bus structures that may further interconnect to a memory bus (with or without a memory controller), a peripheral bus, and/or a local bus using any of a variety of bus architectures. The memory 904 may be one or more devices for storing data and/or computer code for completing or facilitating methods described herein. The memory 904 may include database components, object code components, script components, or other types of information structure for supporting the various activities herein. Any distributed or local memory device may be utilized with the systems and methods of this description. The memory 904 may be communicably connected to the processor device 902 (e.g., via a circuit or any other wired, wireless, or network connection) and may include computer code for executing one or more processes described herein. The memory 904 may include non-volatile memory 908 (e.g., read-only memory (ROM), erasable programmable read-only memory (EPROM), electrically erasable programmable read-only memory (EEPROM), etc.), and volatile memory 910 (e.g., random-access memory (RAM)), or any other medium which can be used to carry or store desired program code in the form of machine-executable instructions or data structures and which can be accessed by a computer or other machine with a processor device 902. A basic input/output system (BIOS) 912 may be stored in the non-volatile memory 908 and can include the basic routines that help to transfer information between elements within the computer system 900.

The computer system 900 may further include or be coupled to a non-transitory computer-readable storage medium such as the storage device 914, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 914 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 914 and/or in the volatile memory 910, which may include an operating system 916 and/or one or more program modules 918. All or a portion of the examples disclosed herein may be implemented as a computer program product 920 stored on a transitory or non-transitory computer-usable or computer-readable storage medium (e.g., single medium or multiple media), such as the storage device 914, which includes complex programming instructions (e.g., complex computer-readable program code) to cause the processor device 902 to carry out the steps described herein. Thus, the computer-readable program code can comprise software instructions for implementing the functionality of the examples described herein when executed by the processor device 902. The processor device 902 may serve as a controller or control system for the computer system 900 that is to implement the functionality described herein.

The computer system 900 also may include an input device interface 922 (e.g., input device interface and/or output device interface). The input device interface 922 may be configured to receive input and selections to be communicated to the computer system 900 when executing instructions, such as from a keyboard, mouse, touch-sensitive surface, etc. Such input devices may be connected to the processor device 902 through the input device interface 922 coupled to the system bus 906 but can be connected through other interfaces such as a parallel port, an Institute of Electrical and Electronic Engineers (IEEE) 1394 serial port, a Universal Serial Bus (USB) port, an IR interface, and the like. The computer system 900 may include an output device interface 924 configured to forward output, such as to a display, a video display unit (e.g., a liquid crystal display (LCD) or a cathode ray tube (CRT)). The computer system 900 may also include a communications interface 926 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer system comprising a processor device configured to:

receive a deactivation request to deactivate a heavy-duty vehicle;

in response to said receiving, determine a controlled partial deactivation instruction of at least one subsystem of the heavy-duty vehicle, wherein the controlled partial deactivation instruction is determined by an autonomous model; and control the heavy-duty vehicle to execute the controlled partial deactivation instruction such that the heavy-duty vehicle is at least partially deactivated either immediately, or after a delay, as determined by the controlled partial deactivation instruction, wherein the autonomous model is configured to:

receive input data, said input data comprising:

historical usage pattern of the heavy-duty vehicle, the historical usage pattern comprising information of deactivation events and activation events of the heavy-duty vehicle having historically occurred at reference locations;

usage data of the heavy-duty vehicle with reference to said reference locations, and the deactivation request, process the input data, wherein the process comprises calculating a cost function, wherein said deactivation and activation events are associated with positive costs, wherein time periods between a deactivation event and a subsequent activation event among said deactivation events and activation events having historically occurred are associated with negative costs, and output the controlled partial deactivation instruction as a result of said processing of the input data.

2. A heavy-duty vehicle comprising the computer system of claim 1.

3. The heavy-duty vehicle according to claim 2, further comprising one or more contactors, a contactor being an electromechanical switching device configured to mechanically operate an electric contact of one or more of the at least one subsystem of the heavy-duty vehicle.

4. The heavy-duty vehicle according to claim 2, wherein the at least one subsystem is an energy-consuming vehicle component.

5. A computer-implemented method for controlling heavy-duty vehicle deactivation, the method comprising:

receiving, by a processor device of a computer system, a deactivation request to deactivate a heavy-duty vehicle;

in response to said receiving, determining, by the processor device, a controlled partial deactivation instruction of at least one subsystem of the heavy-duty vehicle, wherein the controlled partial deactivation instruction is determined by an autonomous model; and controlling, by the processor device, the heavy-duty vehicle to execute the controlled partial deactivation instruction such that the heavy-duty vehicle is at least partially deactivated either immediately, or after a delay, as determined by the controlled partial deactivation instruction, wherein the autonomous model is configured to:

receive input data, said input data comprising:

historical usage pattern of the heavy-duty vehicle, the historical usage pattern comprising information of deactivation events and activation events of the heavy-duty vehicle having historically occurred at reference locations;

usage data of the heavy-duty vehicle with reference to said reference locations, and the deactivation request, process the input data, wherein the process includes calculating a cost function, wherein said deactivation and activation events are associated with positive costs, wherein time periods between a deactivation event and a subsequent activation event among said deactivation events and activation events having historically occurred are associated with negative costs, and output the controlled partial deactivation instruction as a result of said processing of the input data.

6. The method according to claim 5, wherein the autonomous model is weighted for some of the reference locations and/or a particular deactivation request to deactivate the heavy-duty vehicle.

7. The method according to claim 5, wherein the cost function calculates a usage threshold limit by combining the positive and negative costs for said reference locations.

8. The method according to claim 7, wherein said executing of the controlled partial deactivation instruction involves determining whether the usage threshold limit is satisfied for a current geographical location.

9. The method according to claim 5, wherein the cost function is updated over time by continuously calculating positive and negative costs for the reference locations.

10. The method according to claim 9, wherein the cost function is a forgetting function in response to said continuous calculations of positive and negative costs for the reference locations.

11. The method according to claim 5, wherein the controlled partial deactivation instruction comprises:

an instruction to set said at least one subsystem into a lower energy consumption mode; and/or an instruction to deactivate said at least one subsystem.

12. The method according to claim 5, wherein the reference locations comprises one or more geographical areas defined by geographical coordinates retrieved from one or more positioning systems.

13. The method according to claim 5, wherein the deactivation request is received from:

a vehicle subsystem in response to a vehicle subsystem condition being met, or a driver of the heavy-duty vehicle, the driver being a person or an autonomous unit.

14. The method according to claim 5, wherein said controlling comprises selectively opening and/or closing of relays of one or more contactors of the heavy-duty vehicle.

15. The method according to claim 5, wherein the deactivation and activation events of the heavy-duty vehicle comprise geographical data pertaining to the reference locations.

16. A control system comprising one or more control units configured to perform the method of claim 5.

17. A non-transitory computer-readable storage medium storing instructions, which when executed by a computer system, cause the computer system to perform the method of claim 5.

* * * * *